INVENTOR.
ANDREW K. ANANDER
BY
Morgan, Finnegan + Durham
ATTORNEYS.

April 17, 1956     A. K. ANANDER     2,741,962
EXPOSED FILM RECEPTOR FOR PHOTOMECHANICAL CAMERAS
Filed March 17, 1953     3 Sheets-Sheet 2

INVENTOR.
ANDREW K. ANANDER
BY
Morgan, Finnegan & Durham
ATTORNEYS

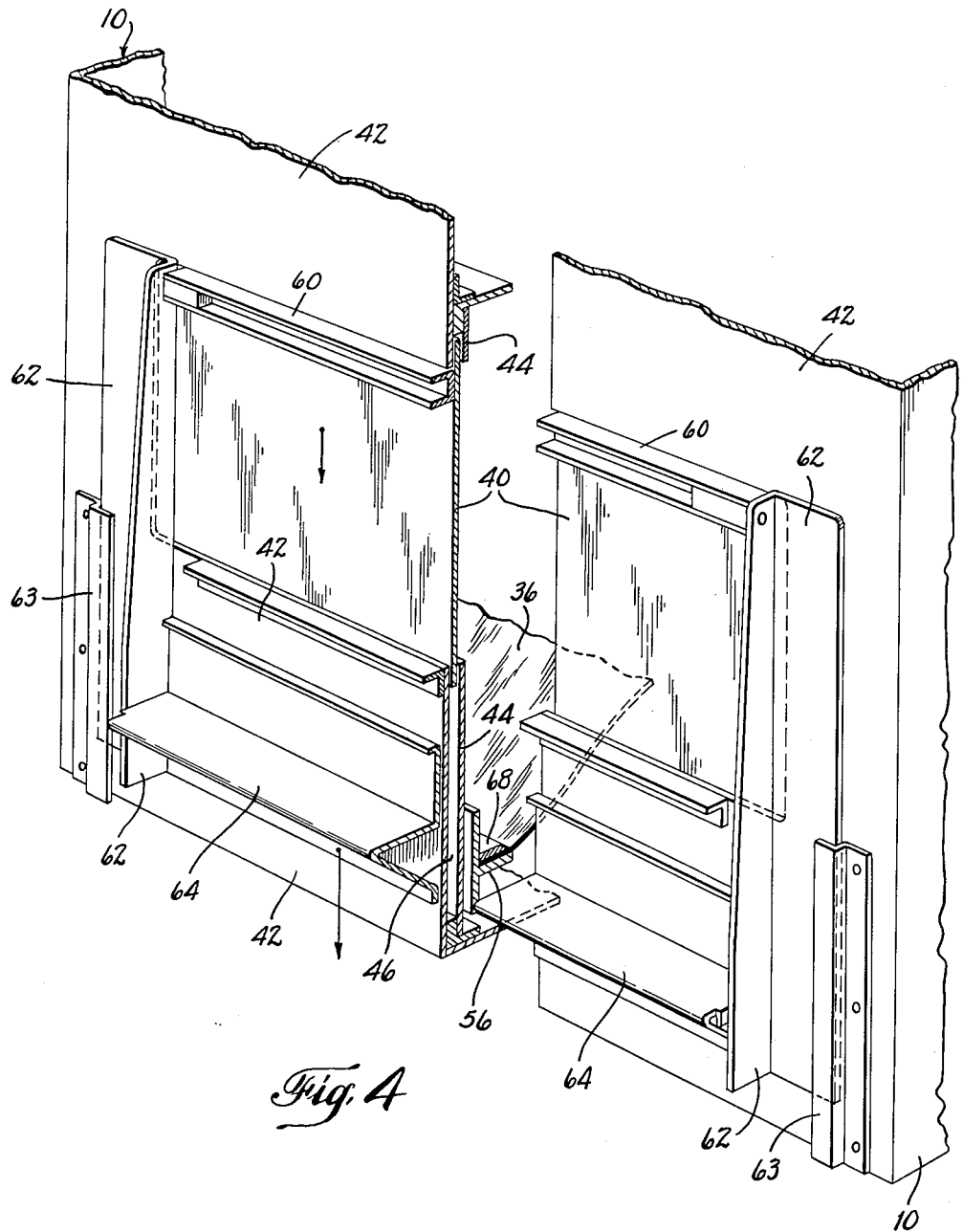

United States Patent Office 2,741,962
Patented Apr. 17, 1956

2,741,962

EXPOSED FILM RECEPTOR FOR PHOTOMECHANICAL CAMERAS

Andrew K. Anander, Glen Cove, N. Y., assignor to Powers Chemco, Inc., Glen Cove, N. Y., a corporation of New York Application March 17, 1953, Serial No. 342,829

9 Claims. (Cl. 95—31)

The present invention relates to a novel and improved photomechanical camera provided with a receptor for temporarily receiving sheets of film after they have been exposed in the camera.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Figure 1:
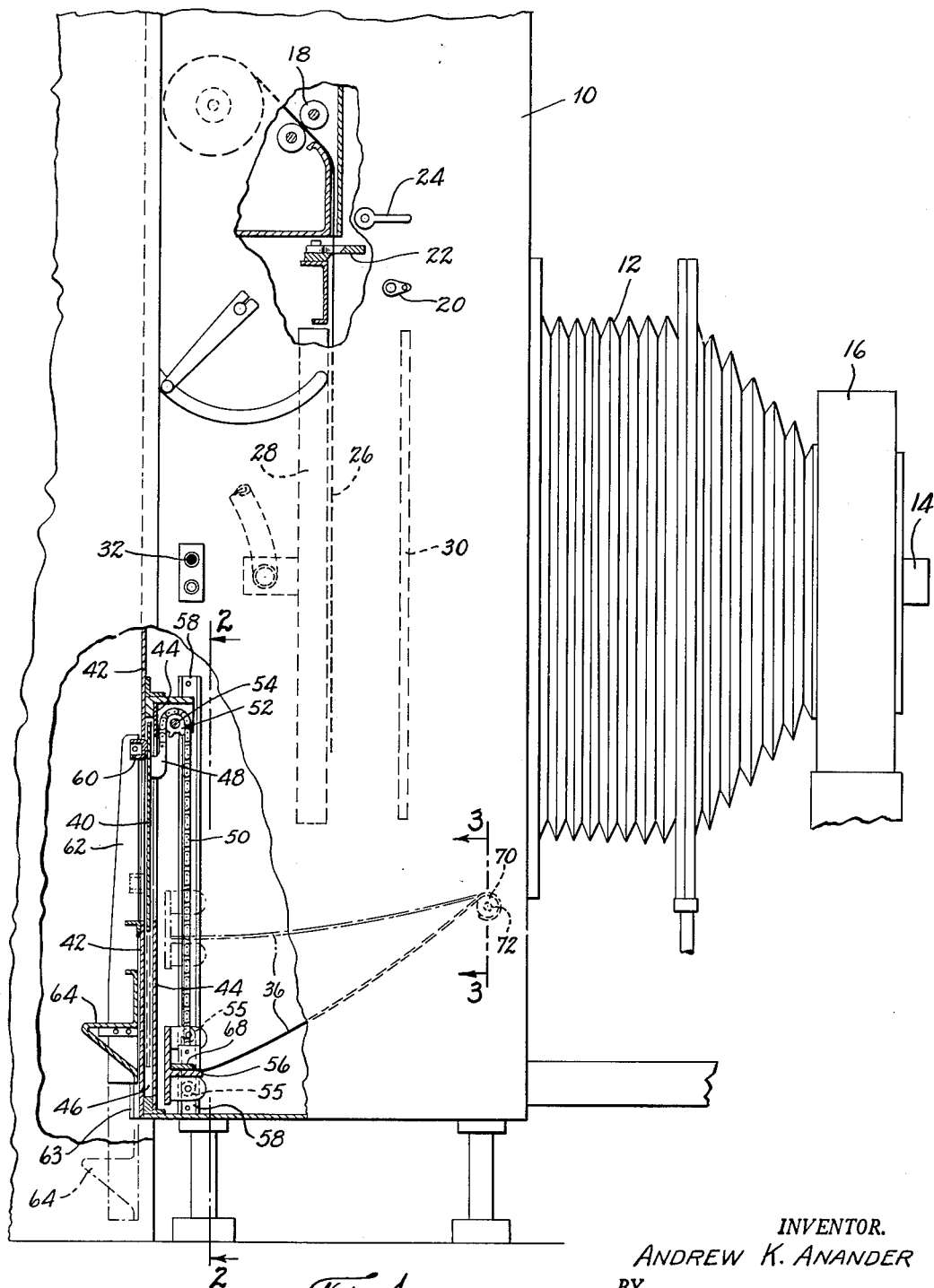
Figure 1 is a fragmentary side elevation of a photomechanical camera with certain parts broken away and other parts shown in section and showing the film receiving means of the present invention.
Figure 2:
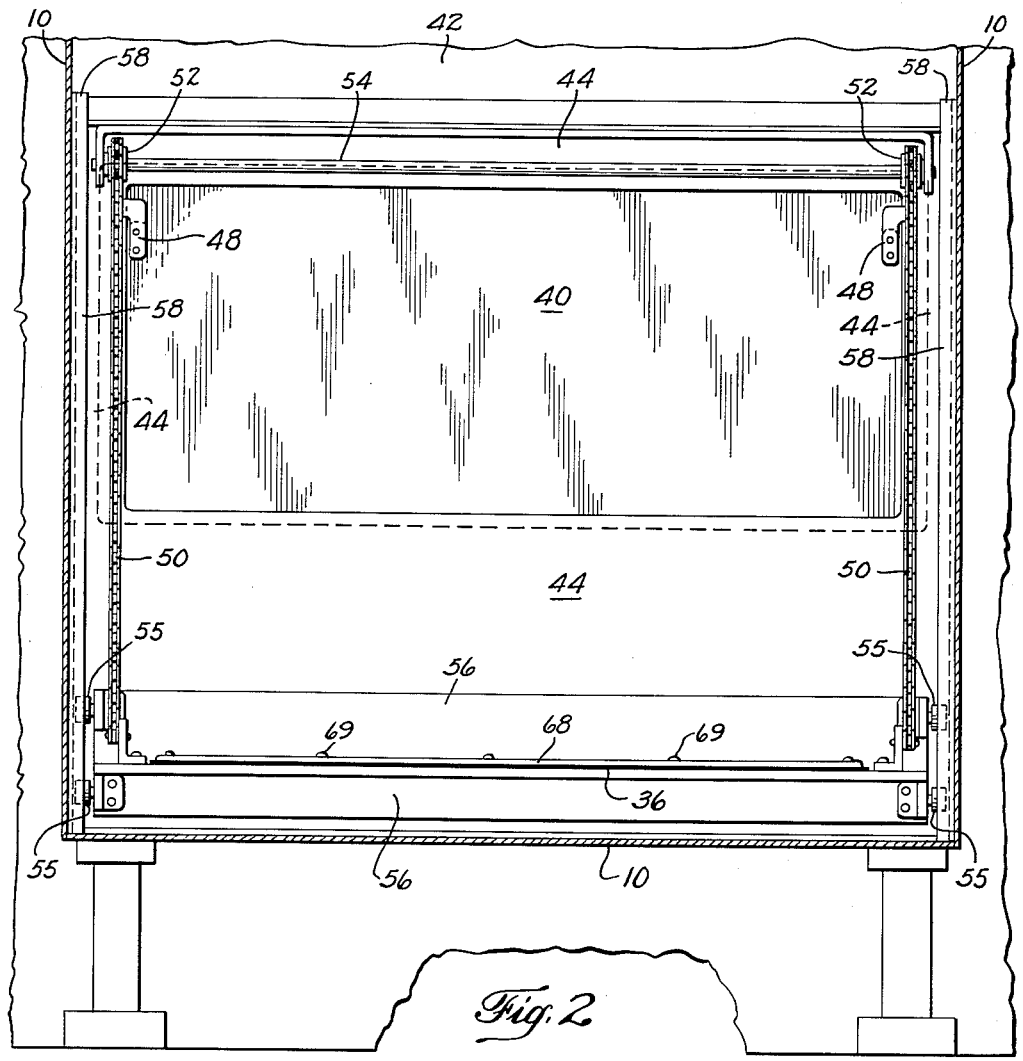
Figure 2 is a fragmentary rear elevation of the lower portion of the camera shown in Figure 1, the rear portion ordinarily being within a dark room where the exposed film is processed.
Figure 3:
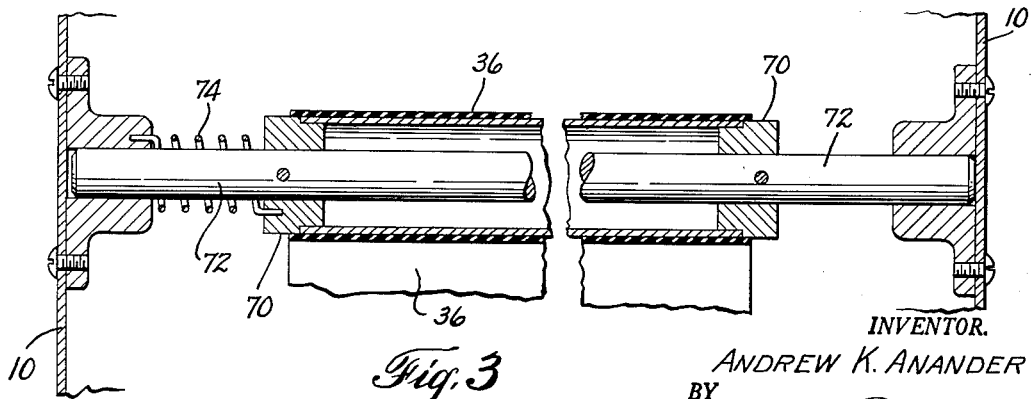
Figure 3 is a fragmentary sectional view taken on the line 3—3 of Figure 1; and, Figure 4 is a fragmentary perspective view looking from the rear of the camera and showing the central vertical portion of the receiving mechanism in section.

The present invention has for its object the provision of a novel and improved exposed film receptor for photomechanical and other large cameras, especially those in which the exposed film is fed to exposure position and cut from a roll of flexible, sensitized, photographic film. A further object is the provision of an improved film receptor in which one or more sheets of exposed film can be collected, while they await development or other processing and are shielded against accidental exposure to light. Still another object is the provision of such a receiving mechanism which positions the exposed film rearwardly of its exposure position and raises the exposed film to a convenient location as the camera operator opens the receptor to remove the film.

According to the present invention, a photomechanical or other relatively large, immobile and stationary camera is provided within its interior and below the exposure area of the camera with a receiving surface extending approximately from one side of the camera to the other and preferably providing a downwardly and rearwardly inclined surface having sufficient slope so that film delivered to it moves rearwardly of the camera and into a similarly sloped position. The lower, rear edge of the inclined surface is adapted to be raised and lowered, while the forward edge of the surface remains relatively stationary, and where the surface is formed as a flexible member, its forward and upper support preferably comprise a roller mechanism on which the flexible member may be rolled up so that it is relatively flat from the forward upper edge to the rear, lower edge, and retains this flat condition as the rear edge is raised when the mechanism is opened for removal of the accumulated sheet or sheets of film.

Pedal controlled access means are provided at the bottom of the rear portion of the camera, preferably at and within the dark room area which usually adjoins the rear of the camera, so that access may be had from the dark room to the exposed film receiving portion of the camera. These means preferably provide a light tight partition between the dark room and the camera interior so that the lighting of the dark room may change from white light to safe light without danger of fogging the exposed film when the access means are in their normal closed position. Means are also provided for rendering the exposed sheet of film more accessible as the access means are opened, and for this purpose in the preferred embodiment, the access door opening means also serves to lift the film receiving means into an upper position where it may be more conveniently removed by the operator.

Thus, in one embodiment of the invention, the film after it has been exposed as a cut sheet of film is deposited on a variably inclined member, face downward so that fogging by a subsequent exposure is eliminated or minimized and the film is protected from extraneous exposure by means of the normally closed access means at the rear of the camera. Pedal means are also provided for actuating the access means so that removal of the film may be easily accomplished and that both of the operator's hands are free for the handling of relatively large sheets of exposed film, and these access means not only provide for the opening of a counterbalanced door, but also for raising the film from a position where its partially inverted position was insured to a position where it can be easily grasped by the operator, all within easy reach of the operator considering the relatively large sizes of the film being exposed and handled.

It will be understood that the foregoing general description and the following detailed description as well are exemplary and explanatory of the invention but are not restrictive thereof.

Referring now in detail to the present preferred and illustrative embodiment of the invention as shown in the accompanying drawings, the invention is shown as applied to a photoengraving or halftone camera of generally conventional construction and which may be generally similar to the camera shown and described in the prior patent to Frank T. Powers, No. 2,282,427 granted May 12, 1942. In such a camera, there is provided a relatively large, light-tight casing 10, on the forward portion of which is movably mounted a camera bellows structure 12, a lens 14 and a lens support 16, movable forwardly and rearwardly for the focussing of the camera. Within the casing 10 are provided the film feeding means 18 actuated by turning an external crank 20 to feed film past a knife 22 which may be actuated by means of an external lever 24, so that a cut length of sensitized sheet material or film is delivered to exposure position and may be secured in this position until after the exposure has been completed. The details of these parts are not shown as they are sufficiently known from the conventional form of the Chemco camera, or from the prior patent above referred to, and merely form one means of feeding lengths of film or sensitized material to the exposure position.

In the exposure position, the film 26 is preferably secured in the focal plane of the camera by means of a vacuum back 28 or other film holding means, and usually behind a halftone screen 30, so that it may be properly exposed in accordance with well-known photomechanical exposure techniques according to the process being carried out.

After the exposure has been completed the film 26 is ready to be released and dropped to the receptor means from which it may be retrieved for development or other further processing. In the Chemco camera, this release involves the discontinuance of the application of suction to the camera back member 28, as by stopping the suction pump motor by pushing the stop button 32, and when the suction is sufficiently reduced the sheet of film 26 drops from the exposure position to the lower portion of the camera.

The receptor means, preferably located in the lower portion of the camera back and directly beneath the exposure position of the film comprises a downwardly and rearwardly inclined surface which is preferably a flexible sheet 36, of cloth or other flexible material, and is supported at its forward and upper edge in front of the exposure position of the film, and is supported at its rear and lower edge on one of the movable access members and is adapted to be raised as the access member is opened.

The access means preferably comprises a vertically movable, rectangular panel member 40 mounted interiorly of the camera casing and of slightly larger dimensions than an opening at the rear of the camera back 42, the marginal edges of the panel member 40 normally overlapping the opening to provide a light tight closure. Around the marginal edges of the panel member 40 and interiorly of the camera back panel 42 are provided sealing strips 44 which are spaced from the camera back sufficiently to allow free vertical movement of the panel 40 and they overlap the marginal edges sufficiently to form an additional light trap. At the bottom of the panel 40, the sealing strip is relatively wide and provides the camera back with a narrow, relatively deep trough 46 into which the panel member 40 may be lowered when it is desired to open the access means. Thus, in its normal position, the panel member 40 closes the opening in the camera back panel 42, and has its marginal edges overlapped both at the rear and front sides of the panel 40 by means of the back panel 42 and the sealing strips 44.

Counterbalancing means are provided for normally holding the panel member 40 in its upper position, and for this purpose it is provided on its interior face with lugs 48 by which it is connected at either side edge to a chain 50, two such chains being provided and being supported by means of the sprockets 52 on a shaft 54 which is journalled on the interior of the camera back panel 42, thereby insuring equal movement of the two chains 50 and the lugs supported thereby. At its inner and lower end, each of the chains 50 is connected to a relatively heavy bar 56 which extends across the width of the panel member 40 and is adapted to be vertically guided by rollers 55 which run in guideways 58 mounted on the interior sidewalls of the camera casing 10. Bar 56 is of sufficient mass to overpower the mass of the panel 40 and to insure its return to its normal upper position.

To facilitate the opening operation of the access means, the panel member 40 is provided near its upper, rear edge with a channel member 60 extending across the width of the panel member 40, to which is pivotally mounted a pair of rearwardly extending, depending links 62 between the lower ends of which is secured a pedal member 64 which is normally spaced from the floor on which the camera is mounted and which may be pushed downwardly by the operator's foot, carrying with it the vertically movable panel member 40. Links 62 are vertically guided by the slideways formed by the angle strips 63 secured to the rear of the panel 40. Thus, on moving the pedal member 64 downwardly, the panel member 40 is pulled downwardly against the weight of the bar 56 so as to open the rear film receiving portion of the camera for removal of the exposed film.

The lower edge of the film receiving member 36 is preferably made fast to the bar 56 so that it is adapted to be raised and lowered oppositely to the movement of the panel member 40 and is normally held in its lowermost position. For this purpose, the rear edge of the flexible sheet 36 is clamped between a flat surface of the bar 56 and a clamping bar 68 secured thereto by suitable bolts 69. The front edge of the flexible sheet 36 is preferably secured to a spring roller 70 which exerts a constant tension on the sheet 36 so as to maintain it relatively taut and allows the rear of the sheet 36 to be moved from its lower to its upper position as shown in Figure 1. Roller 70 is mounted on a shaft 72 which is journaled in the side walls of the camera casing 10 and is urged to maintain the sheet 36 taut by means of the spring 74 helically coiled about the shaft 72 and made fast to the roller 70 and camera casing 10 at the ends of the spring. Thus, as the closure panel member 40 is in its lower position, the sheet 36 is inclined downwardly at a fairly steep angle, while it is raised to more nearly a horizontal position as the lowering of the panel member 40 causes the counterweighting bar 56 to be moved upwardly. In its lower position, the sheet 36 is so positioned with reference to the normal dropping position of an exposed sheet of film, that the sheet of film will come to rest with its sensitized surface downwardly, and with its lower edge towards the rear of the camera casing.

In use, the access door is normally closed and remains closed while film is fed to exposure position and during the exposure, but after the suction holding means for the film has been rendered inoperative, the film is allowed to drop and comes to rest on the flexible receptor sheet 36 in its lower, or full-line, position as shown in Figure 1. When the operator is ready to remove the exposed sheet of film for development, he depresses the pedal member 64 with his foot, thereby moving the panel member 42 of the access means against the weight of the counterbalancing bar 56 and by this movement the rear edge of the flexible sheet 36 is raised, slack in the sheet 36 being taken up by the helical spring 74 acting on the roller 70. The operator may then reach into the lower portion of the camera casing and remove the exposed sheet of film. As the operator releases his foot from the pedal member 64, the counterweight causes the panel member 42 of the access means to be raised into its uppermost and light excluding position.

The invention in its broader aspects is not limited to the specific mechanisms shown and described but departures may be made therefrom within the scope of the accompanying claims without departing from the principles of the invention, and without sacrificing its chief advantages.

What is claimed is:

1. In a photographic camera, the combination of means for releasably holding a sheet of sensitized material in exposure position, a normally closed casing within which the sheet is held during exposure, normally closed access means forming part of the casing, an inclined member onto which the sheet is dropped as it is released from exposure position, and means for raising said inclined member as the access means is opened whereby the sensitized sheet is rendered more easily accessible through said access means.

2. A camera as claimed in claim 1 in which the access means comprises a vertically movable door which may be lowered to open the casing.

3. In a photographic camera, the combination of means for releasably holding a sheet of sensitized material in exposure position, a normally closed casing within which the sheet is held during exposure, said casing including a normally closed access door through which the sensitized material may be grasped and removed from the casing, a flexible member having one end supported at a fixed height and extending downwardly and away from said end, and means for raising the other, normally lower end of said flexible member as the access door is opened.

4. A camera as claimed in claim 3 in which the upper end of the flexible member is supported on a spring wound roller to take up slack in the flexible member as its lower end is raised.

5. A camera as claimed in claim 4 in which the access door is a normally raised vertically movable member and is connected to the lower end of the flexible member to raise said lower end as the access door is lowered.

6. In a photographic camera, the combination of means for releasably holding a sheet of sensitized material in exposure position, a normally closed casing within which the sheet is held during exposure, said casing including a normally closed vertically movable access door through which the sensitized material may be removed from the casing, a flexible member having its forward end supported at a fixed height and extending rearwardly towards and below said door, and means for raising said lower end as the access door is lowered.

7. A camera as claimed in claim 6 in which the vertically movable door is normally held in its closed position by a counterweight and the flexible member has its rear lower end attached to the counterweight.

8. A camera as claimed in claim 7 in which the forward end of the flexible member is wound on a roller and means are provided for rotating the roller to take up slack in the flexible member.

9. A camera as claimed in claim 1 in which the member is inclined downwardly and rearwardly with respect to the camera.

References Cited in the file of this patent

UNITED STATES PATENTS

| | | |
|---|---|---|
| 1,185,191 | Garland | May 30, 1916 |
| 2,095,849 | Wittel | Oct. 12, 1937 |
| 2,375,555 | Howard | May 8, 1945 |